United States Patent
Kamada

(10) Patent No.: US 11,679,708 B2
(45) Date of Patent: Jun. 20, 2023

(54) VEHICLE FOOTREST SUPPORT STRUCTURE

(71) Applicant: HONDA MOTOR CO., LTD., Tokyo (JP)

(72) Inventor: Tomohito Kamada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 326 days.

(21) Appl. No.: 16/916,356

(22) Filed: Jun. 30, 2020

(65) Prior Publication Data
US 2021/0001762 A1   Jan. 7, 2021

(30) Foreign Application Priority Data
Jul. 5, 2019  (JP) .............................. JP2019-125858

(51) Int. Cl.
| B60N 3/06 | (2006.01) |
| F16F 7/12 | (2006.01) |
| F16F 1/376 | (2006.01) |

(52) U.S. Cl.
CPC ............... B60N 3/06 (2013.01); F16F 1/376 (2013.01); F16F 7/123 (2013.01)

(58) Field of Classification Search
CPC .............. F16F 1/376; F16F 7/123; B60N 3/06
See application file for complete search history.

(56) References Cited

U.S. PATENT DOCUMENTS

| 3,311,331 A * | 3/1967 | Steimen ................... | F16F 1/376 |
| | | | 248/633 |
| 2017/0057431 A1* | 3/2017 | Singh .................. | B60R 13/0815 |

FOREIGN PATENT DOCUMENTS

| CN | 203681356 | | 7/2014 |
| DE | 102005052842 | | 5/2007 |
| JP | 10297345 A | * | 11/1998 |
| JP | 2000-233676 | | 8/2000 |
| JP | 2004-330957 | | 11/2004 |
| JP | 2004-338624 | | 12/2004 |
| JP | 2005-145286 | | 6/2005 |
| JP | 2005-537982 | | 12/2005 |
| JP | 2014-061783 | | 4/2014 |

(Continued)

OTHER PUBLICATIONS

Japanese Office Action for Japanese Patent Application No. 2019-125858 dated Mar. 1, 2022.

(Continued)

*Primary Examiner* — Melody M Burch
(74) *Attorney, Agent, or Firm* — Amin, Turocy & Watson, LLP

(57) ABSTRACT

A footrest support structure includes a footrest main body 10 on which a foot of an occupant is placeable, a panel member 14 of a vehicle interior floor, and a shock absorbing member 15. The panel member 14 has an inclined portion 14*b* inclined forward and upward from the horizontal portion 14*a*. The shock absorbing member 15 is interposed between the panel member 14 and the footrest main body 10. The inclined portion 14*b* of the panel member 14 has a recessed portion 18 that is recessed downward. The shock absorbing member 15 has a thinned portion 21 in a portion facing the recessed portion 18, which is thinner than other portions. A deformation-allowing space 30 is formed between the recessed portion 18 and the shock absorbing member 15.

7 Claims, 6 Drawing Sheets

(56) References Cited

FOREIGN PATENT DOCUMENTS

| JP | 2005-081958 | | | 3/2015 |
|----|-------------|---|---|--------|
| JP | 2016-104595 | | | 6/2016 |
| KR | 970036997 | A | * | 7/1997 |
| KR | 101132029 | B1 | * | 4/2012 |
| WO | 2012/176320 | | | 12/2012 |

OTHER PUBLICATIONS

Japanese Notice of Allowance for Japanese Patent Application No. 2019-125858 dated Jun. 28, 2022.

* cited by examiner

VEHICLE FOOTREST SUPPORT STRUCTURE

CROSS-REFERENCE TO RELATED APPLICATION

Priority is claimed on Japanese Patent Application No. 2019-125858, filed Jul. 5, 2019, the content of which is incorporated herein by reference.

BACKGROUND OF THE INVENTION

Field of the Invention

The present invention relates to a vehicle footrest support structure.

Description of Related Art

A footrest on which a foot that is not operating a pedal is placed is disposed in a foot area on a side in front of a driver's seat of a vehicle. In the footrest, a footrest main body (a foot placing portion) made of a resin plate, a metal plate, carpet or the like is provided on a floor panel with a shock absorbing member made of, for example, foamed resin therebetween (see, for example, Patent Document 1).

In the footrest support structure disclosed in Japanese Unexamined Patent Application, First Publication No. 2005-81958 (Patent Document 1), a floor panel is provided with an inclined portion that is inclined forward and upward from a horizontal portion, and a block-shaped shock absorbing member is attached by straddling the horizontal portion and the inclined portion. An upper portion of the shock absorbing member is covered with a part of the carpet constituting the footrest main body. The shock absorbing member is disposed to rise upward with respect to upper surfaces of the horizontal portion and the inclined portion of the floor panel and, when a large load is input from a sole of an occupant through the carpet at the time of a shock load being input, absorbs the input load using plastic contraction deformation of the entire body.

SUMMARY OF THE INVENTION

However, the footrest support structure disclosed in Patent Document 1 absorbs an input load using only the plastic contraction deformation of the shock absorbing member at the time of a shock load being input. For this reason, unless the rigidity of the shock absorbing member as low as a certain degree or less and a volume of the shock absorbing member is high, a large load input through the footrest main body may not be able to be sufficiently absorbed. Therefore, in the case of the footrest support structure disclosed in Patent Document 1, the sole of the occupant may not be able to stabilize easily when the occupant puts his or her foot on a footrest portion during normal use.

Therefore, an object of the present invention is to provide a vehicle footrest support structure in which an input load can be sufficiently absorbed when a shock load is input, and a sole of an occupant can be stably supported during normal use.

A vehicle footrest support structure according to the present invention employ the following configurations.

(1) A vehicle footrest support structure according to an aspect of the present invention includes a footrest main body (for example, a footrest main body 10 of an embodiment) on which a foot of an occupant is placeable, a panel member (for example, a panel member 14 of an embodiment) of a vehicle interior floor which has an inclined portion (for example, an inclined portion 14b of an embodiment) inclined forward and upward from a horizontal portion (for example, a horizontal portion 14a of an embodiment), and a shock absorbing member (for example, a shock absorbing member 15 of an embodiment) interposed between the panel member and the footrest main body, in which the inclined portion of the panel member has a recessed portion which is recessed downward (for example, a recessed portion 18 of an embodiment), the shock absorbing member has a thinned portion (for example, a thinned portion 21 of an embodiment) in a portion facing the recessed portion, which is thinner than other portions, and a deformation-allowing space (for example, a deformation-allowing space 30 of an embodiment) is formed between the recessed portion and the shock absorbing member.

According to the aspect of (1), when a large load is input to the footrest main body from the sole of the occupant in a case at the time of a shock load being input, the shock absorbing member is deformed by plastically contracting, and the shock absorbing member is deformed by bending starting from a vicinity of the thinned portion in the deformation-allowing space. In this case, the input load is absorbed due to the plastic contraction deformation of the shock absorbing member and the bending deformation starting from the vicinity of the thinned portion. For this reason, in a case in which the above configuration is adopted, a large load at the time of a shock load being input can be sufficiently absorbed using the shock absorbing member even if a rigidity of the shock absorbing member is high and a volume thereof is low. Further, in a case in which the above configuration is adopted, a deformation behavior of the shock absorbing member can be easily set and adjusted by changing positions and sizes of the thinned portion of the shock absorbing member and the recessed portion of the panel member.

(2) In the vehicle footrest support structure according to the aspect of (1), the recessed portion may be configured to be formed at a position close to a rising start portion (for example, a rising start portion 19 of an embodiment) of the inclined portion of the panel member extending from the horizontal portion.

According to the aspect of (2), shock absorption at a position close to the rising start portion of the shock absorbing member can be made to be responsible for the bending deformation starting from the vicinity of the thinned portion. For this reason, the volume of the shock absorbing member positioned at a portion on which a heel or the toes of the occupant are placed (a portion above the rising start portion) can be reduced. For this reason, it is possible to prevent the portion on which the heel or the toes of the occupant are placed from greatly protruding upward. Therefore, in a case in which the above configuration is adopted, a posture of the sole of the occupant placed on the footrest main body can be stabilized.

(3) In the vehicle footrest support structure according to the aspect of (1) or (2), the shock absorbing member may be configured to have a first thickened portion (for example, a first thickened portion 22 of an embodiment) whose thickness increases forward from the thinned portion.

According to the aspect of (3), since the thickness of the shock absorbing member on a side forward from the thinned portion increases forward, a load acting forward from the footrest main body can be stably received by the shock absorbing member. For this reason, when a relatively small load is input in front of the footrest main body due to vehicle braking or the like during normal use, it is possible to prevent a rear portion of the footrest main body from sinking downward due to a deformation of the shock absorbing member starting from the thinned portion. Therefore, in a case in which the above configuration is adopted, a posture of the sole of the occupant during normal use can be further stabilized.

(4) In the vehicle footrest support structure according to the aspect of (3), the shock absorbing member may be configured to include a second thickened portion (for example, a second thickened portion 23 of an embodiment) whose thickness increases rearward from the thinned portion.

According to the aspect of (4), the thinned portion of the shock absorbing member is sandwiched between the first thickened portion on a side in front thereof and the second thickened portion on a side to the rear thereof. For this reason, when a large load is input from the footrest main body to the shock absorbing member, stress is concentrated on the thinned portion having a relatively small thickness, and the shock absorbing member readily undergoes bending deformation starting from the thinned portion.

(5) In the vehicle footrest support structure according to the aspect of any one of (1) to (4), the shock absorbing member may be configured to have a plurality of protruding portions (for example, a first protruding portion 24 and a second protruding portion 25 of an embodiment) which abut the panel member along a peripheral edge of the recessed portion.

According to the aspect of (5), when a relatively small load is input to the shock absorbing member through the footrest main body during vehicle braking or the like, the protruding portion receives a load at the peripheral edge of the recessed portion so that deformation of the thinned portion toward the recessed portion (downward sinking of the footrest main body) can be prevented. In addition, when a large load is input to the shock absorbing member from the sole of the occupant through the footrest main body at the time of a shock load being input, the protruding portion is deformed by contracting at the peripheral edge of the recessed portion while the shock absorbing member is deformed by bending starting from the vicinity of the thinned portion. For this reason, it is possible to absorb a large load with a sufficient deformation stroke of the shock absorbing member.

(6) In the vehicle footrest support structure according to the aspect of (5), the protruding portions may come into surface contact with the panel member outside the peripheral edge of the recessed portion.

According to the aspect of (6), since the protruding portions come into surface contact with the panel member outside the peripheral edge of the recessed portion, the protruding portion does not hinder the bending deformation of the thinned portion of the shock absorbing member at the time of a shock load being input. Further, it is possible to inhibit the shock absorbing member from sinking (deforming) in the deformation-allowing space due to the protruding portion which comes into surface contact outside of the peripheral edge of the recessed portion at the time of vehicle braking or the like.

(7) In the vehicle footrest support structure according to the aspect of (5) or (6), the protruding portions may include at least one first protruding portions (for example, the first protruding portion 24 of the embodiment) which abut a portion of the recessed portion on an outer side thereof in a vehicle width direction and at least one second protruding portions (for example, the second protruding portion 25 of the embodiment) which abut a portion of the recessed portion on an outer side thereof in a longitudinal direction of the vehicle, the second protruding portion may be formed to be longer in the vehicle width direction than a length of the recessed portion in the vehicle width direction, and the first protruding portion may have an abutting surface with respect to the panel member which is formed to be smaller than that of the second protruding portion.

According to the aspect of (7), the footrest main body can be stably supported in the vehicle width direction using the second protruding portion which has a length longer than that of the recessed portion in the vehicle width direction. Further, since the first protruding portion disposed outside the recessed portion in the vehicle width direction has the abutting surface with the panel member which is smaller than the second protruding portion, the first protruding portion does not easily obstruct bending deformation at the vicinity of the thinned portion when a large load is input from the footrest main body to the shock absorbing member at the time of a shock load being input. Therefore, in a case in which the above configuration is adopted, the input load can be sufficiently absorbed using the shock absorbing member at the time of a shock load being input.

(8) In the vehicle footrest support structure according to the aspect of any one of (1) to (7), a side member (for example, a side member 20 of an embodiment) extending in the vehicle width direction may be disposed below the panel member, and the side member may be joined to the panel member to form a closed cross-section together with a region of the panel member including the recessed portion.

According to the aspect of (8), the recessed portion protrudes into the closed cross-section which is a dead space between the side member and the panel member. For this reason, the recessed portion does not narrow a component layout space below the side member. Therefore, in a case in which the above configuration is adopted, a degree of freedom in component layout below the panel member can be increased. Further, since the inclined portion of the panel member on which the shock absorbing member is disposed on the upper surface side forms a part of the closed cross-section, an input load acting on the shock absorbing member through the footrest main body can be received with high rigidity of the closed cross-section.

(9) In the vehicle footrest support structure according to the aspect of any one of (1) to (8), the recessed portion may be formed to be gently curved with respect to general surfaces on sides in front of and behind the recessed portion of the panel member.

According to the aspect of (9), since the recessed portion is formed to be gently curved, it is unlikely that stress will act on a part of the recessed portion when a load is input. For this reason, it is possible to advantageously inhibit deterioration in the vicinity of the recessed portion with the lapse of time. Further, since the recessed portion is gently curved, it is unlikely that water droplets and the like will remain in the recessed portion.

According to the present invention, when a shock load is input, the input load can be sufficiently absorbed due to the contraction deformation of the shock absorbing member and the bending deformation starting from the vicinity of the thinned portion. For this reason, even if the rigidity of the shock absorbing member is high and the volume thereof is low, an input load can be sufficiently absorbed at the time of a shock load being input.

Therefore, in a case in which the present invention is adopted, an input load can be sufficiently absorbed when a shock load is input, and the sole of an occupant can be stably supported during normal use.

DETAILED DESCRIPTION OF THE INVENTION

Figure 1:
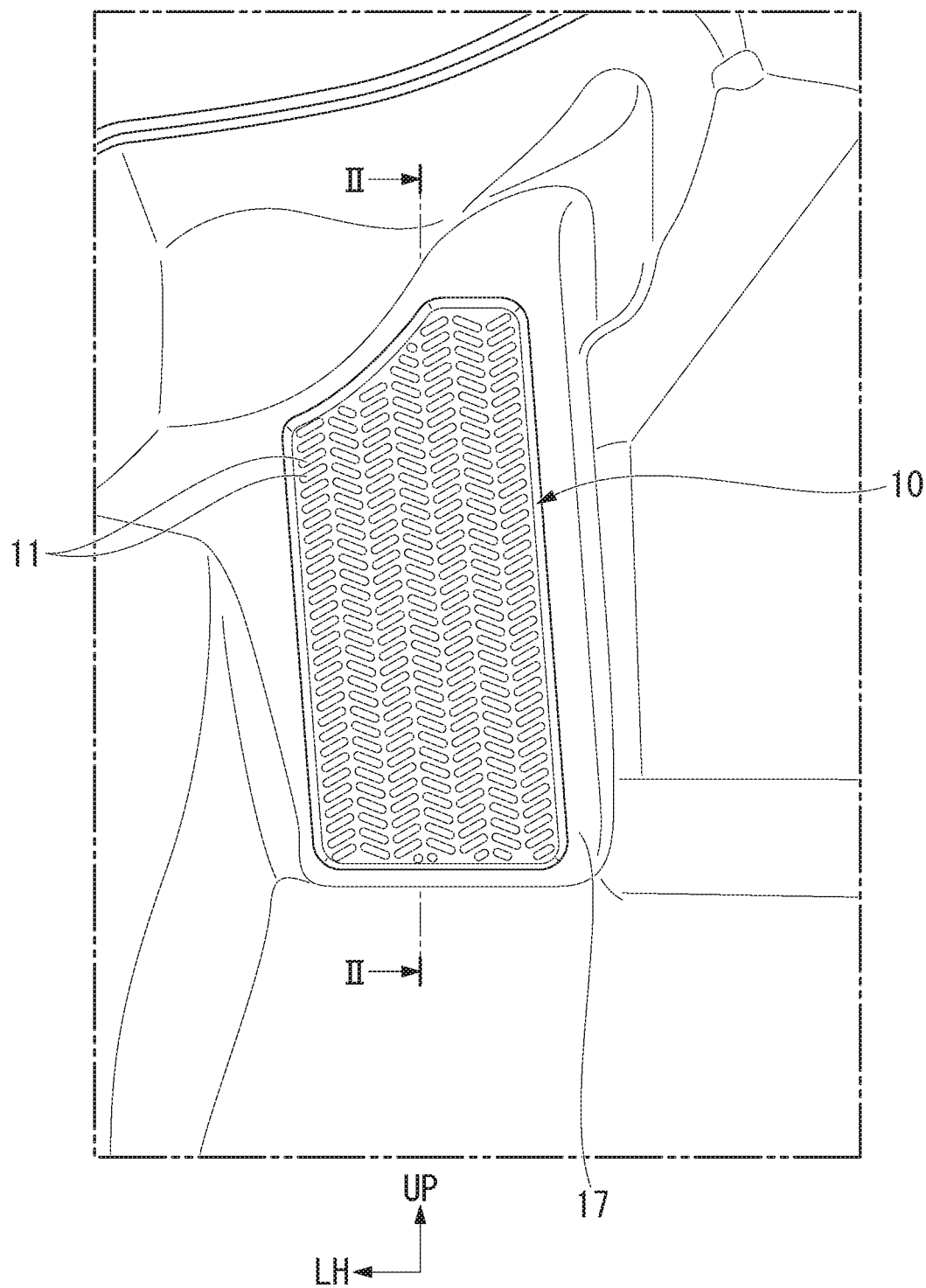
FIG. 1 is a perspective view showing a vehicle interior floor portion of a vehicle of an embodiment.

Hereinafter, embodiments of the present invention will be described with reference to the drawings. Also, in the following description, forward, rearward, upward, downward, leftward and rightward indicate forward, rearward, upward, downward, leftward and rightward in a vehicle unless otherwise specified. In addition, an arrow UP indicating upward in the vehicle, an arrow FR indicating forward in the vehicle, and an arrow LH indicating leftward in the vehicle are shown at appropriate places in the drawings.

Figure 2:
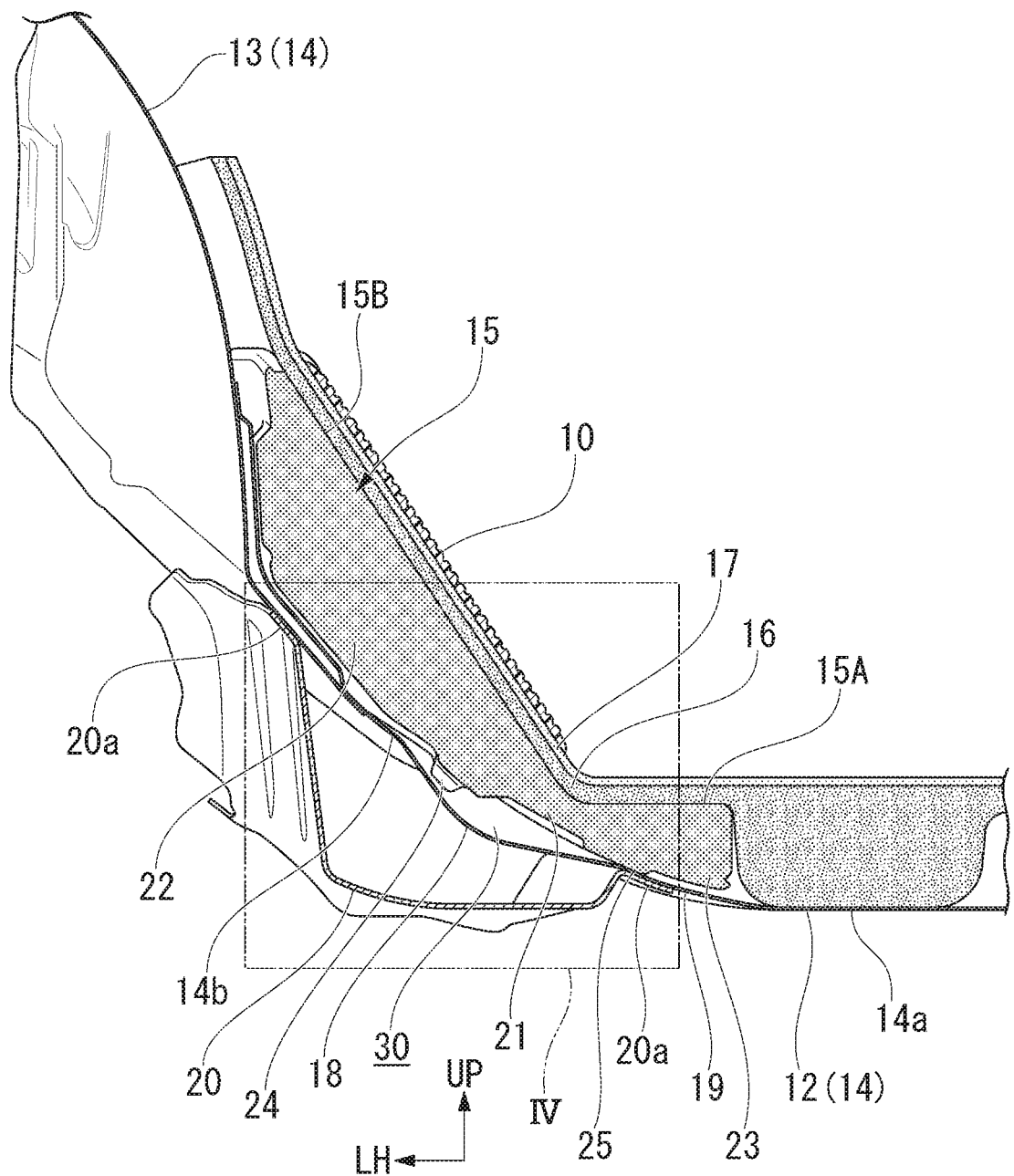
FIG. 2 is a cross-sectional view along line II-II in FIG. 1.

FIG. 1 is a perspective view of a front lower portion (a foot area) of a driver's seat of a vehicle according to the present embodiment when viewed from above a rear portion thereof, and FIG. 2 is a cross-sectional view along line II-II in FIG. 1.

A footrest main body 10 on which a foot of an occupant is placeable is disposed below a front portion of the driver's seat. In the case of the present embodiment, the footrest main body 10 is configured of a resin plate, a metal plate, or the like. The footrest main body 10 is formed in a substantially rectangular shape with a portrait orientation in a front view. An anti-slip unevenness pattern 11 is formed on an upper surface side of the footrest main body 10.

As shown in FIG. 2, a floor portion in front of the driver's seat includes a floor panel 12 extending forward from below the driver's seat (not shown), and a dashboard lower 13 extending downward from an inner side (a front side) of an instrument panel (not shown). A front edge portion of the floor panel 12 overlaps a lower edge portion of the dashboard lower 13 and is joined to the lower edge portion of the dashboard lower 13. In the present embodiment, the floor panel 12 and the dashboard lower 13 form a panel member 14 of the vehicle interior floor. Hereinafter, when the floor panel 12 and the dashboard lower 13 are not particularly distinguished from each other, they will be collectively referred to as the panel member 14.

The panel member 14 includes a horizontal portion 14a and an inclined portion 14b extending obliquely upward from a front portion of the horizontal portion 14a. A block-shaped shock absorbing member 15 is disposed on an upper surface of a front region of the horizontal portion 14a and an upper surface of the inclined portion 14b. The shock absorbing member 15 is disposed below the footrest main body 10. The shock absorbing member 15 is formed of, for example, foamed resin or the like and absorbs energy by receiving an external force and being plastically deformed. An upper surface of the shock absorbing member 15 is covered with a part of the carpet 17 with a sound absorbing material 16 interposed therebetween. In addition, the sound absorbing material 16 and the carpet 17 are also continuously disposed on a portion of the panel member 14 on which the shock absorbing member 15 is not disposed. The footrest main body 10 is mounted on the carpet 17 above the shock absorbing member 15.

The inclined portion 14b of the panel member 14 has a recessed portion 18 that is recessed downward in a concave shape. The recessed portion 18 is formed at a position close to a rising start portion 19 extending from the horizontal portion 14a in the inclined portion 14b of the panel member 14. Further, a side member 20 which is a vehicle body strength member extending in a vehicle width direction is disposed below the inclined portion 14b of the panel member 14. The side member 20 is formed in a hat shape in cross-section that opens upward. Flange portions 20a at a front edge portion and a rear edge portion of the side member 20 are joined to a lower surface of the inclined portion 14b of the panel member 14. The side member 20 forms a closed cross-section together with a region of the inclined portion 14b of the panel member 14 including the recessed portion 18.

Figure 3:
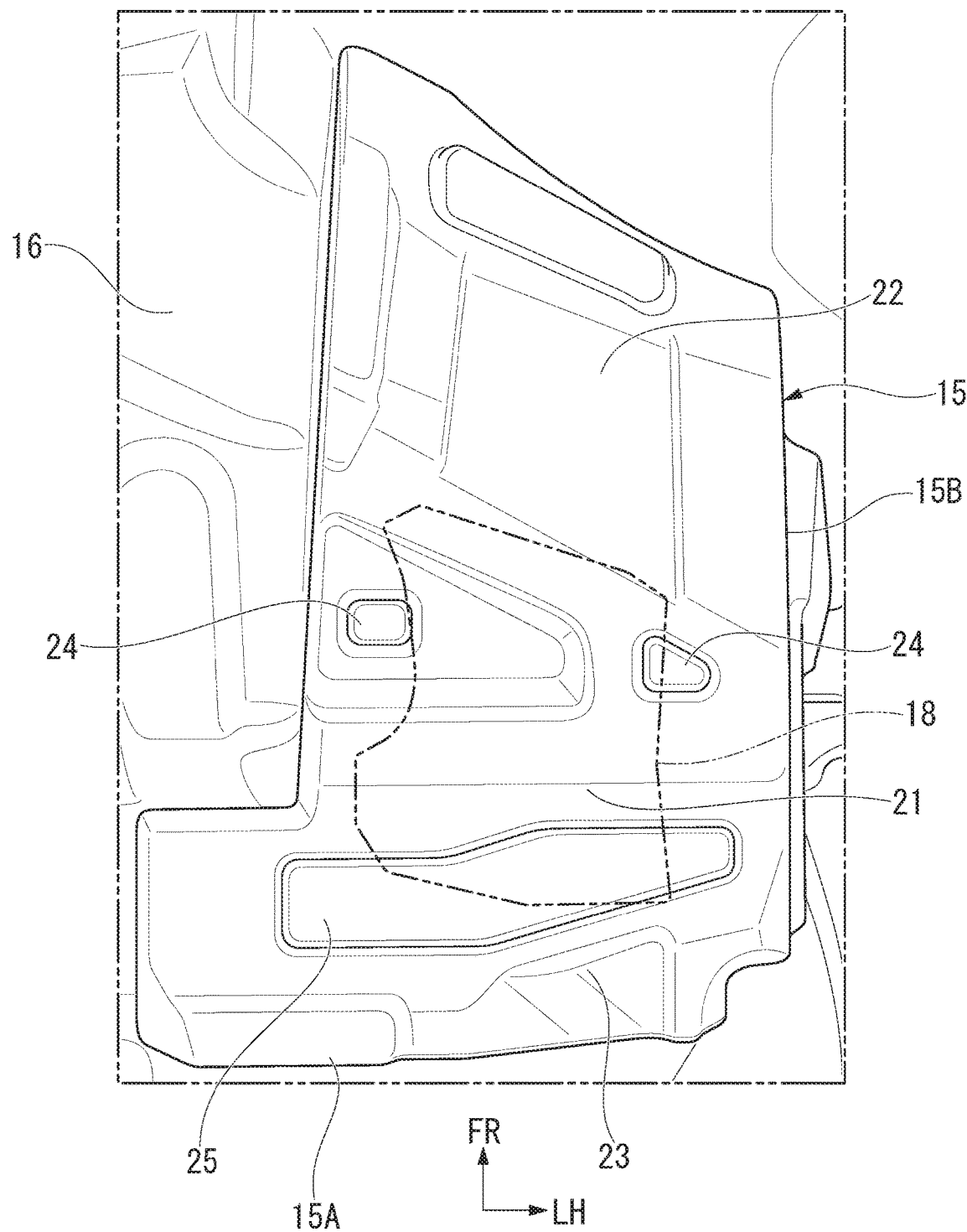
FIG. 3 is a diagram of a footrest support portion of the vehicle of the embodiment when viewed from below with a panel member on the vehicle interior floor removed.
Figure 4:
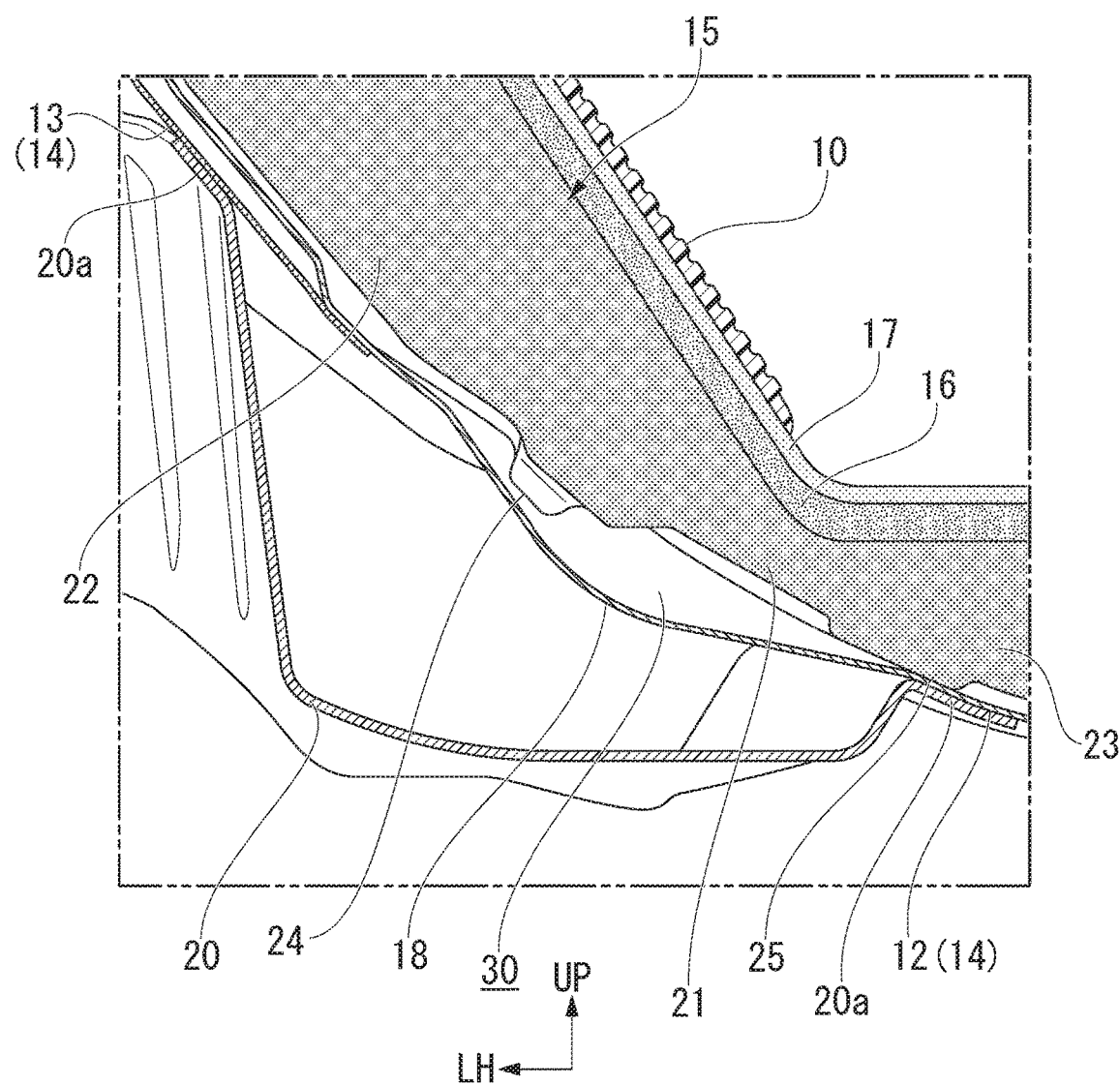
FIG. 4 is an enlarged view of section IV in FIG. 2.

FIG. 3 is a diagram of a footrest support portion of the vehicle when viewed from below with the panel member 14 removed, and FIG. 4 is an enlarged view of section IV in FIG. 2.

As shown in FIGS. 2 and 3, the shock absorbing member 15 has a base block portion 15A which is disposed across a front edge portion of the horizontal portion 14a and a rear edge portion of the inclined portion 14b of the panel member 14, and an inclined block portion 15B which is connected to the base block portion 15A and is disposed on the upper surface of the inclined portion 14b of the panel member 14. The base block portion 15A is formed in a substantially rectangular shape with a landscape orientation (longer in the vehicle width direction) in a top view, and the inclined block portion 15B is formed in a substantially rectangular shape with a portrait orientation (longer in a longitudinal direction of the vehicle) in a top view. The base block portion 15A protrudes a predetermined length inward in the vehicle width direction with respect to the inclined block portion 15B.

A thinned portion 21 having a smaller thickness than other portions is formed at a portion of the shock absorbing member 15 that extends across a front edge portion of the base block portion 15A and a rear edge portion of the inclined block portion 15B. The thinned portion 21 is formed at a position facing the recessed portion 18 on the panel member 14 side when the shock absorbing member 15 is provided on the panel member 14. In addition, in the case of the present embodiment, as shown in FIG. 3, the recessed portion 18 is formed in a substantially rectangular shape (a substantially parallelogram shape) in a bottom view. The shock absorbing member 15 forms a deformation-allowing space 30 between itself and the recessed portion 18 on the panel member 14 side when the shock absorbing member 15 is provided on the panel member 14. The deformation-allowing space 30 allows a downward bending deformation starting from the vicinity of the thinned portion 21 of the shock absorbing member 15 when a large load is input to the shock absorbing member 15.

Further, in a region of the inclined block portion 15B forward from the thinned portion 21, the thickness gradually increases forward from the thinned portion 21. The portion in which the thickness gradually increases forward forms a first thickened portion 22. Further, in a region of the base block portion 15A rearward from the thinned portion 21, the thickness gradually increases rearward from the thinned portion 21. The portion in which the thickness gradually increases rearward forms a second thickened portion 23. The thinned portion 21 has a thinner vertical thickness relative to the first thickened portions 22 and the second thickened portion 23 in front of and behind the thinned portion 21.

A pair of first protruding portions 24 that can abut both side edge portions of the recessed portion 18 of the panel member 14 on an outer side in the vehicle width direction are formed on a lower surface of the inclined block portion 15B. The first protruding portions 24 protrude downward from the lower surface of the inclined block portion 15B with substantially constant cross-sections. When the shock absorbing member 15 is provided on the panel member 14, the first protruding portions 24 extend along left and right edge portions (peripheral edges) of the recessed portion 18 and come into surface contact with upper surfaces on outer sides of the edge portions.

Further, a second protruding portion 25 that can abut an edge portion of the recessed portion 18 of the panel member 14 on the rear side (an outer side in the longitudinal direction of the vehicle) is formed on a lower surface of the base block portion 15A. The second protruding portion 25 protrudes downward from the lower surface of the base block portion 15A with a substantially constant cross-section. The second protruding portion 25 is formed in a substantially rectangular shape which is longer in the vehicle width direction than a length of the recessed portion 18 in the vehicle width direction in a bottom view. When the shock absorbing member 15 is provided on the panel member 14, the second protruding portion 25 extends along a rear edge portion (a peripheral edge) of the recessed portion 18 and comes into surface contact with an upper surface on an outer side of the rear edge portion. Both end portions of the second protruding portion 25 in the vehicle width direction extend further outward in the vehicle width direction than both end portions of the recessed portion 18 in the vehicle width direction. Further, as shown in FIG. 3, an abutting surface of each first protruding portion 24 with respect to the panel member 14 is formed to be smaller than an abutting surface of the second protruding portion 25 with respect to the panel member 14.

Further, the recessed portion 18 provided on the inclined portion 14b of the panel member 14 is formed to be gently curved relative to general surfaces in front of and behind of the recessed portion 18. The recessed portion 18 is formed to be entirely inclined downward from a front end side toward a rear end side thereof.

Next, with reference to FIGS. 5 and 6, a behavior of each part when a load is input from a sole of an occupant to the footrest support portion will be described.

Figure 5:
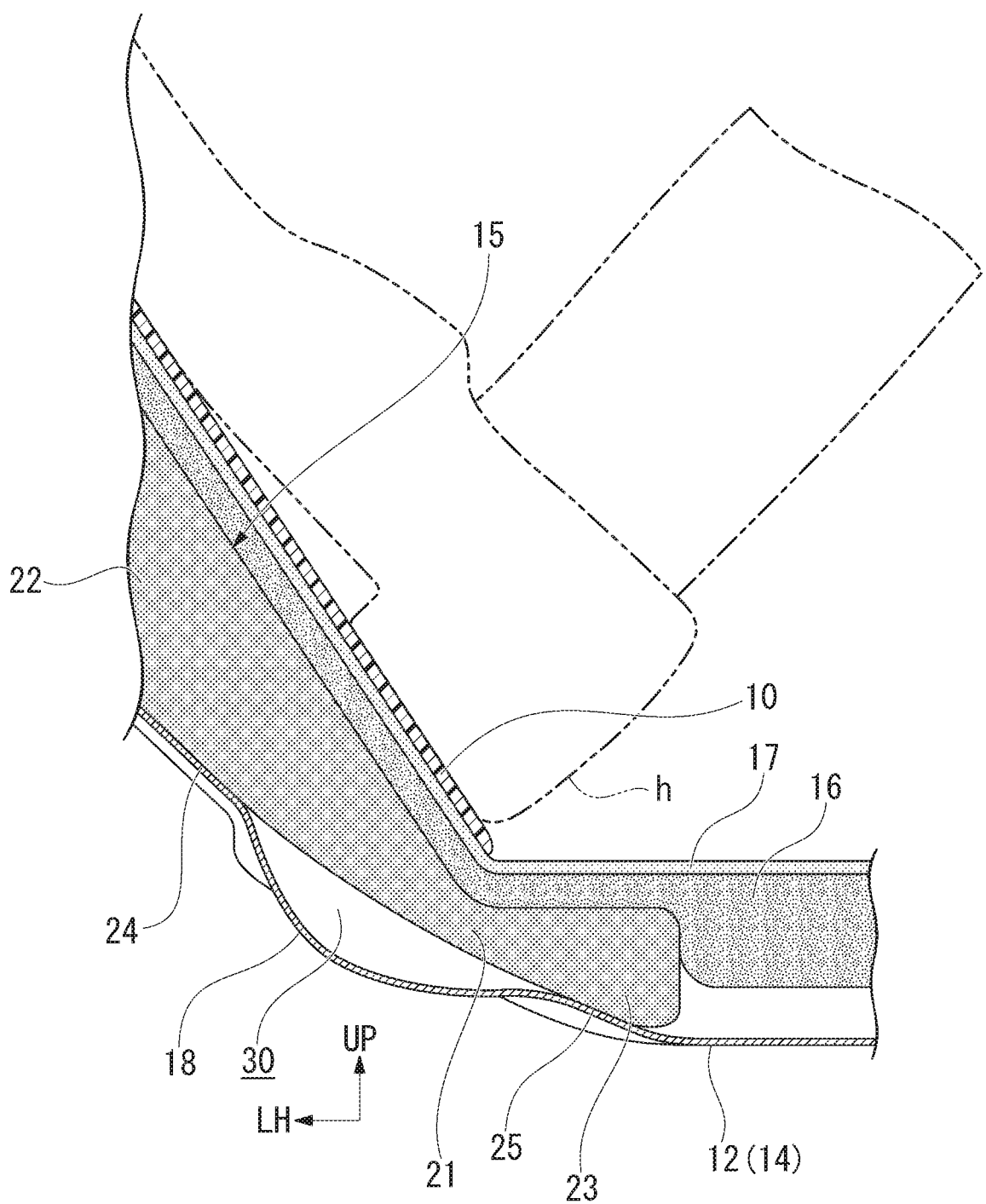
FIG. 5 is a schematic cross-sectional view of substantially the same portion as that in FIG. 4 when a small load is input to the footrest support portion.
Figure 6:
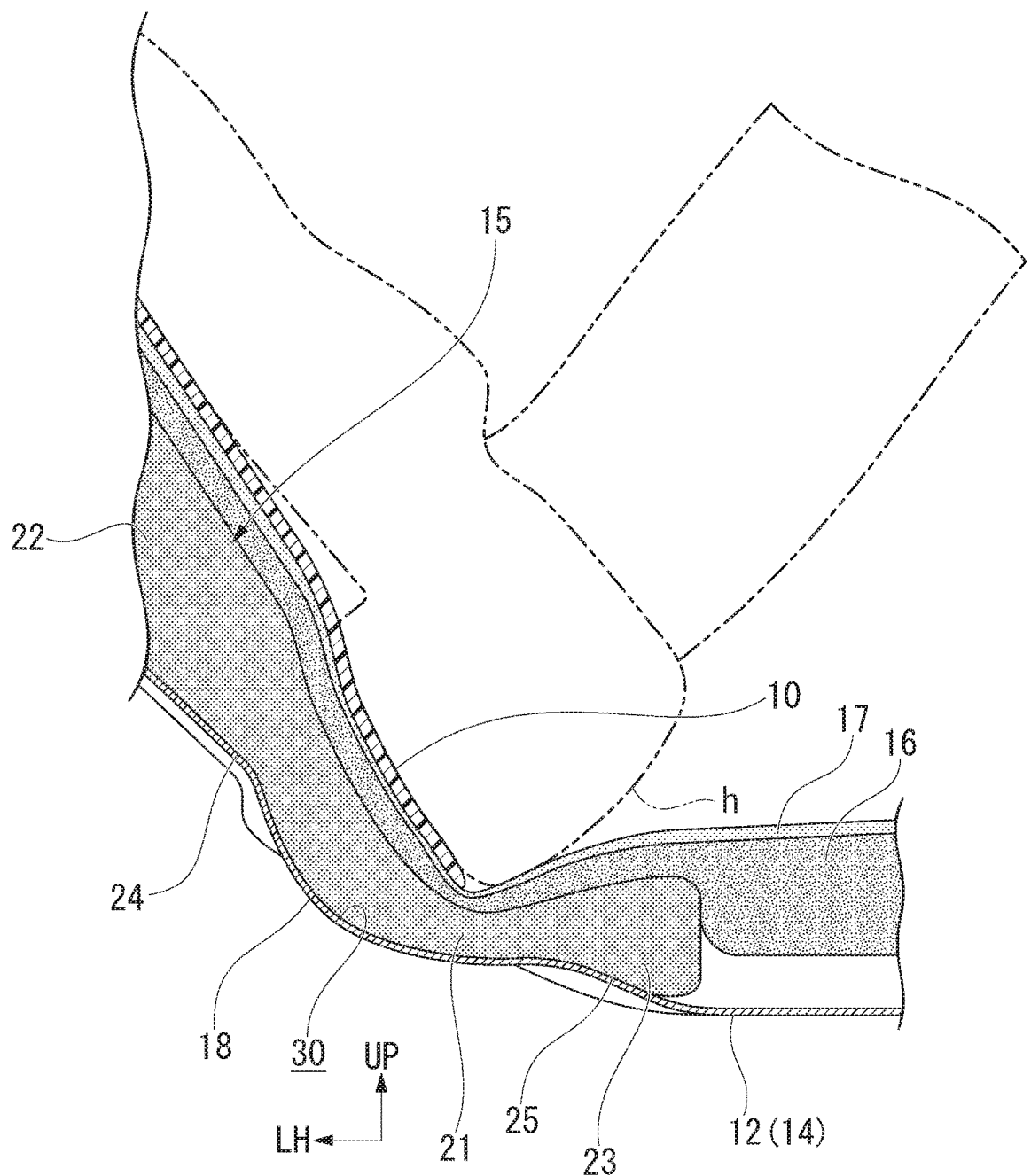
FIG. 6 is a schematic cross-sectional view of substantially the same portion as that in FIG. 4 when a large load is input to the footrest support portion.

FIG. 5 is a cross-sectional view of the footrest support portion when a small load is input to the footrest support portion, and FIG. 6 is a cross-sectional view of the footrest support portion when a large load is input to the footrest support portion. Also, reference sign h in FIGS. 5 and 6 represents a foot of the occupant placed on the footrest main body 10.

When a relatively small load is input to the footrest main body 10 from the sole of the occupant during vehicle braking or the like, the load is transmitted to the shock absorbing member 15 through the footrest main body 10. In this way, when a small load is input to the shock absorbing member 15 from the sole of the occupant, the shock absorbing member 15 receives the input load while it elastically deforms, as shown in FIG. 5.

Further, when a large load is input to the footrest main body 10 from the sole of the occupant, such as when a shock load is input from in front of the vehicle, the load is transmitted to the shock absorbing member 15 through the footrest main body 10. When a large load is input to the shock absorbing member 15 from the sole of the occupant in this manner, as shown in FIG. 6, while the shock absorbing member 15 is deformed by plastically contracting over almost its entire area, the shock absorbing member 15 bends starting from the vicinity of the thinned portion 21 and the bent portion is deformed to enter the recessed portion 18 of the panel member 14. The input load is absorbed by the shock absorbing member 15 during this period.

As described above, in the footrest support structure of the present embodiment, the thinned portion 21 is provided at the portion of the shock absorbing member 15 which faces the recessed portion 18 on the panel member 14 side and the deformation-allowing space 30 is formed between the recessed portion 18 and the shock absorbing member 15. For this reason, when the shock load is input, the input load can be sufficiently absorbed due to the plastic contraction deformation of the shock absorbing member 15 and the bending deformation of the shock absorbing member 15 starting from the vicinity of the thinned portion 21.

In the case of the footrest support structure of the present embodiment, since a large load can be absorbed not only using the plastic contraction deformation of the shock absorbing member 15 but also using the bending deformation of the shock absorbing member 15 in the vicinity of the thinned portion 21, the input large load can be sufficiently absorbed even if a rigidity of the shock absorbing member 15 is high and a volume thereof is low. Therefore, in a case in which the footrest support structure of the present embodiment is adopted, the input load can be sufficiently absorbed when a shock load is input, and the sole of the occupant can be stably supported during normal use.

Further, in the case in which the footrest support structure of the present embodiment is adopted, a deformation behavior of the shock absorbing member 15 can be easily set and adjusted by changing positions and sizes of the thinned portion 21 of the shock absorbing member 15 and the recessed portion 18 of the panel member 14.

In addition, in the footrest support structure of the present embodiment, the recessed portion 18 is formed at the position close to the rising start portion 19 of the inclined portion 14b of the panel member 14. For this reason, shock absorption at the position close to the rising start portion 19 of the shock absorbing member 15 can be performed using the bending deformation starting from the vicinity of the thinned portion. Therefore, in a case in which the configuration of the present embodiment is adopted, it is possible to reduce the volume (a vertical height) of the shock absorbing member 15 positioned at a portion on which the heel and toes of the occupant are placed (above the rising start portion 19). For this reason, a posture of the sole of the occupant placed on the footrest main body 10 can be further stabilized.

Further, in the footrest support structure of the present embodiment, the first thickened portion 22 is provided on the side in front of the thinned portion 21 of the shock absorbing member 15 so that the thickness gradually increases forward from the thinned portion 21. For this reason, the load acting forward from the footrest main body 10 can be stably received by the first thickened portion 22 of the shock absorbing member 15. Therefore, in a case in which the configuration of the present embodiment is adopted, when a relatively small load is input forward from the footrest main body 10 due to vehicle braking or the like, the first thickened portion 22 stably receives the load so that the shock absorbing member 15 can be prevented from being deformed by bending starting from the thinned portion 21. For this reason, it is possible to prevent a rear portion of the footrest main body 10 from sinking downward, and as a result, it is possible to further stabilize the posture of the sole of the occupant.

In addition, in the footrest support structure of the present embodiment, the second thickened portion 23 in which the thickness gradually increases rearward from the thinned portion 21 is provided on the rear side of the thinned portion 21 of the shock absorbing member 15. For this reason, the thinned portion 21 of the shock absorbing member 15 is sandwiched between the first thickened portion 22 on the side in front and the second thickened portion 23 on the rear side. Therefore, when a large load is input to the shock absorbing member 15 through the footrest main body 10, stress is concentrated on the thinned portion 21 having a relatively small thickness, and the shock absorbing member 15 is easily deformed by bending starting from the thinned portion 21. Accordingly, in a case in which the present configuration is adopted, a bending displacement of the shock absorbing member 15 can be more reliably generated when the shock load is input.

Also, in the footrest support structure of the present embodiment, the first protruding portions 24 and the second protruding portion 25 are provided in the shock absorbing member 15 to protrude therefrom, and the first protruding portions 24 and the second protruding portion 25 abut the panel member 14 along the peripheral edge of the recessed portion 18. For this reason, when a small load is input to the shock absorbing member 15 through the footrest main body 10 during vehicle braking or the like, the first protruding portions 24 and the second protruding portion 25 receive the load at the peripheral edge of the recessed portion 18 so that deformation of the vicinity of the thinned portion 21 toward the recessed portion 18 can be prevented. Therefore, downward sinking of the rear portion of the footrest main body 10 can be inhibited.

In addition, when a large load is input to the shock absorbing member 15 through the footrest main body 10, the shock absorbing member 15 is deformed by bending starting from the vicinity of the thinned portion 21 while the first protruding portions 24 and the second protruding portion 25 are deformed by contracting at the peripheral edge of the recessed portion 18, and thus the large load can be absorbed with a sufficient deformation stroke of the shock absorbing member 15.

Also, in the case of the present embodiment, the first protruding portions 24 and the second protruding portion 25 come into surface contact with the panel member 14 outside the peripheral edge of the recessed portion 18. For this reason, when a large load is input, the first protruding portions 24 and the second protruding portion 25 do not hinder the bending deformation of the shock absorbing member 15 at the thinned portion 21. On the other hand, when a small load is input, it is possible to inhibit the vicinity of the thinned portion 21 of the shock absorbing member 15 from sinking into the deformation-allowing space 30 using the first protruding portions 24 and the second protruding portion 25 that come into surface contact with the outer side of the peripheral edge of the recessed portion 18.

Further, in the footrest support structure of the present embodiment, the lower surface of the shock absorbing member 15 is provided with the first protruding portions 24 that abuts the portion of the recessed portion on the outer side in the vehicle width direction and the second protruding portion 25 that abuts the portion of the recessed portion on the rear side of the vehicle. In addition, the second protruding portion 25 is formed to be longer in the vehicle width direction than the length of the recessed portion 18 in the vehicle width direction. For this reason, the footrest main body 10 can be stably supported in the vehicle width direction by the second protruding portion 25 that is longer than the recessed portion 18 in the vehicle width direction.

Also, in the present embodiment, the abutting surface of the first protruding portion 24 with respect to the panel member 14 is formed to be smaller than that of the second protruding portion 25. For this reason, when a large load is input from the footrest main body 10 to the shock absorbing member 15 at the time of a shock input, the first protruding portion 24 does not easily hinder the bending deformation in the vicinity of the thinned portion 21. Therefore, in a case in which the present configuration is adopted, the input load can be sufficiently absorbed by the shock absorbing member 15 when a shock is input.

In addition, in the footrest support structure of the present embodiment, the side member 20 extending below the panel member 14 in the vehicle width direction is joined to the panel member 14, and the side member 20 forms the closed cross-section together with the region including the recessed portion 18 of the panel member 14. For this reason, in the case of the present configuration, the recessed portion 18 protrudes into the closed cross-section that is a dead space between the side member 20 and the panel member 14, and the recessed portion 18 does not narrow a component layout space below the side member 20. Therefore, in a case in which the present configuration is adopted, a degree of freedom in component layout below the panel member 14 can be increased.

Further, in the case of the present configuration, since the inclined portion 14b of the panel member 14 forms a part of the closed cross-section, the input load acting on the shock absorbing member 15 through the footrest main body 10 can be received with a high rigidity of the closed cross-section.

Further, in the footrest support structure of the present embodiment, the recessed portion 18 is formed to be gently curved with respect to general surfaces in front of and behind of the recessed portion 18 of the panel member 14. For this reason, it is unlikely that stress will act on a part of the recessed portion 18 when a load is input, and it is possible to advantageously inhibit deterioration in the vicinity of the recessed portion 18 with the lapse of time.

In addition, in the case of the present configuration, since the recessed portion 18 is gently curved, water droplets or the like do not easily stay in the recessed portion 18. In particular, as in the present embodiment, when the entire recessed portion 18 is inclined downward toward the front or the rear, water droplets or the like remaining in the recessed portion 18 can be further inhibited.

The present invention is not limited to the above embodiment, and various changes in design can be made without departing from the scope of the invention. For example, although the pair of left and right first protruding portions 24 are provided on the lower surface of the shock absorbing member 15 in the embodiment described above, the number of the first protruding portions 24 may be one or three or more.

Also, although the second protruding portion 25 is provided to protrude on the lower surface of the shock absorbing member 15 to abut the rear portion of the recessed portion 18 of the panel member 14 in the above embodiment, the second protruding portion 25 may be provided to protrude on the lower surface of the shock absorbing member 15 to abut a front portion of the recessed portion 18 of the panel member 14. Further, a pair of second protruding portions 25 may be provided to abut a front side and a rear side of the recessed portion 18 of the panel member 14.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Footrest main body
14 Panel member
14*a* horizontal portion
14*b* Inclined portion
15 Shock absorbing member
18 Recessed portion
19 Rising start portion
20 Side member
21 Thinned portion
22 First thickened portion
23 Second thickened portion
24 First protruding portion (protruding portion)
25 Second protruding portion (protruding portion)
30 Deformation-allowing space

What is claimed is:

1. A vehicle footrest support structure comprising:
a footrest main body on which a foot of an occupant is placeable;
a panel member of a vehicle interior floor which includes an inclined portion inclined forward and upward from a horizontal portion; and
a shock absorbing member interposed between the panel member and the footrest main body,
wherein the inclined portion of the panel member includes a recessed portion which is recessed downward,
the shock absorbing member includes a thinned portion in a portion facing the recessed portion, which is thinner than other portions,
a deformation-allowing space is formed between the recessed portion and the shock absorbing member,
the shock absorbing member includes a plurality of protruding portions which abut the panel member along a peripheral edge of the recessed portion,
the protruding portions include at least one first protruding portion which abuts a portion of the recessed portion on an outer side thereof in a vehicle width direction and at least one second protruding portion which abuts a portion of the recessed portion on an outer side thereof in a longitudinal direction of a vehicle,
the at least one second protruding portion is formed to be longer in the vehicle width direction than a length of the recessed portion in the vehicle width direction, and
the at least one first protruding portion includes an abutting surface with respect to the panel member which is formed to be smaller than that of any of the at least one second protruding portion.

2. The vehicle footrest support structure according to claim 1, wherein the recessed portion is formed at a position close to a rising start portion of the inclined portion of the panel member extending from the horizontal portion.

3. The vehicle footrest support structure according to claim 1, wherein the shock absorbing member includes a first thickened portion whose thickness increases forward from the thinned portion.

4. The vehicle footrest support structure according to claim 3, wherein the shock absorbing member includes a second thickened portion whose thickness increases rearward from the thinned portion.

5. The vehicle footrest support structure according to claim 1, wherein the protruding portions come into surface contact with the panel member outside the peripheral edge of the recessed portion.

6. The vehicle footrest support structure according to claim 1,
wherein a side member extending in the vehicle width direction is disposed below the panel member, and
the side member is joined to the panel member to form a closed cross-section together with a region of the panel member including the recessed portion.

7. The vehicle footrest support structure according to claim 1, wherein the recessed portion is formed to be curved with respect to general surfaces in front of and behind the recessed portion of the panel member.

\* \* \* \* \*